(12) United States Patent (10) Patent No.: US 6,462,729 B2
Morita (45) Date of Patent: *Oct. 8, 2002

(54) SEARCH AND DISPLAY APPARATUS

(75) Inventor: Takashi Morita, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/075,774

(22) Filed: Jun. 11, 1993

(65) Prior Publication Data

US 2001/0040579 A1 Nov. 15, 2001

(30) Foreign Application Priority Data

Jun. 30, 1992 (JP) ............................................. 04-195996

(51) Int. Cl.⁷ ................................................. G09G 5/00
(52) U.S. Cl. ........................ 345/156; 345/901; 345/211; 434/317
(58) Field of Search ...................... 395/154; 364/419.02, 364/708.1; 345/156, 901, 185, 164, 905, 507, 173, 202, 211; 369/77.1, 772, 75.1; 434/307, 308, 318, 322, 323, 169, 185, 317, 309; 273/434, 437, 438; 361/681–686

(56) References Cited

U.S. PATENT DOCUMENTS

| | | | |
|---|---|---|---|
| 4,855,725 A | | 8/1989 | Fernandez .................... 340/706 |
| 5,043,721 A | * | 8/1991 | May ........................ 340/825.44 |
| 5,132,871 A | * | 7/1992 | Densham et al. ............ 361/683 |
| 5,214,514 A | * | 5/1993 | Haberkern .................... 386/97 |
| 5,233,333 A | * | 8/1993 | Borsuk ........................ 345/127 |
| 5,359,580 A | | 10/1994 | Miura et al. ................... 369/32 |
| 5,406,273 A | * | 4/1995 | Nishida et al. .............. 345/168 |
| 5,481,265 A | * | 1/1996 | Russell .......................... 341/22 |
| 5,502,695 A | | 3/1996 | Miura et al. ................... 369/32 |
| 5,535,184 A | | 7/1996 | Miura et al. ................... 369/32 |
| 5,914,706 A | * | 6/1999 | Kono .......................... 345/173 |

FOREIGN PATENT DOCUMENTS

| | | | | |
|---|---|---|---|---|
| EP | 0163511 | * | 12/1985 | ................. 434/185 |
| JP | 52114287 | * | 7/1983 | ................. 345/185 |

OTHER PUBLICATIONS

Toshiba Reference Manual, 1989, pp. 1/1, 1/4, 1/5, 6/1.*

* cited by examiner

Primary Examiner—Lun-Yi Lao
(74) Attorney, Agent, or Firm—Oblon, Spivak, McClelland, Maier & Neustadt, P.C.

(57) ABSTRACT

A compact, light weight and display apparatus is formed with a display, a bulk storage means and a key signal entering are housed in a display operating unit which is provided as a separate case from a driving unit 11 for reproducing the data stored in a disc storage medium, so that when the two are connected to each other, the reproducing data read from the driving unit are transferred to the display operating unit, and is sequentially stored into the bulk storage. And when carrying it around, the display operating unit is to be disconnected, and the reproduced data stored in the bulk storage are displayed on the display based on the operation of the key signal entering. Therefore, the necessary data can be freely searched without carrying the thick and heavy driving unit, thus enhancing the convenience for use.

46 Claims, 2 Drawing Sheets

SEARCH AND DISPLAY APPARATUS

FIELD OF THE INVENTION

This invention relates to a search and displaying apparatus, and is applicable to such as a portable search and display apparatus, which reads the data corresponding to the search terms entered by the user from a disc storage medium and displays them.

BACKGROUND OF THE INVENTION

Heretofore, there has been proposed a portable search and display apparatus, in which enormous characters and image information of a word dictionary or an English-Japanese dictionary are stored in a disc storage medium as digital data, and data designated by a user are searched, in a short time, to display the data on a liquid crystal display.

Usually, such a search and display apparatus is composed of the main unit for reproducing the data stored in a so-called CD-ROM (Compact Disc Read Only Memory) and the display unit for displaying the reproduced data. The display unit is rotatably supported on to the main unit.

The conventional apparatus constructed thus comprises within a case a central processing unit (hereinafter referred to as CPU (Central Processing Unit)) controlling the processing for each unit, a reproducing unit, a data processing circuit and a display controller. The CPU controls the reproducing unit, the data processing circuit, the display controller and the liquid crystal display, so that the searched data read from the CD-ROM are displayed on the liquid crystal display, via the reproducing unit, the data processing unit, and the display controller.

In such a main unit, the whole size and weight thereof has been determined practically based on the size of the disc drive and the disc cartridge holding mechanism in the reproducing block, and the weight of the disc drive motor for rotatably driving the CD-ROM and the optical system for searching data. The thickness of the disc drive can not be made smaller than 20 [mm], considering the thickness of the disc cartridge for carrying the CD-ROM, the thickness of the holder for holding the disc cartridge and the thickness of the disc drive motor. With consideration of the other required components also, the miniaturization of the main unit is limited. Thereby it was inconvenient to carry it.

Further, in the U.S. Patent No. 4,855,725, there is shown a technology that an output of a CD-ROM reproducing apparatus controlled by means of a desk top computer is transmitted to an electronic book comprising a liquid crystal display using an IR transmitter. In this case, the CD-ROM drive is controlled by means of the desk top computer, and microprocessors as control devices are required to be provided both in the desk top computer and in the electronic book.

SUMMARY OF THE INVENTION

In view of the foregoing, an object of this invention is to provide a portable search and display apparatus being smaller in size and lighter in weight than the conventional one and convenient to carry around.

The foregoing object and other objects of the invention have been achieved by the provision of the search and display apparatus comprises a disc drive block having reproducing means for reproducing the recorded data stored in the disc storage medium; a display and control block made as a separate case and easily removable from the disc drive block, on which are mounted a display means, a semiconductor bulk storage means and a key signal input means; wherein the display and control block, while it is connected to the disc drive block, sequentially stores the reproducing data read from the reproducing block into the semiconductor storage means; and the display and control block, while it is disconnected from the disc drive block, displays the reproducing data stored into the semiconductor bulk storage means on the display means, based on the operation of the key signal input means.

The disc drive block and the display and control block are in separate cases and easily removable. While the display and control block is connected to the disc drive block, the disc drive block sequentially transmits the reproduced data read from the reproducing block to the semiconductor bulk storage means and stores the same, and while the display and control block is disconnected from the disc drive block, the reproducing data stored into the semiconductor bulk storage means based on the operation of the key signal input means are displayed on the display means. Thereby, if it is necessary to carry it around, only the compact display and control block need be carried around, thus improving the convenience of use.

According to the present invention, the display and control block which comprises display means, semiconductor bulk storage means, and key signal input means is made as a separate case which is easy to remove from the disc drive block reproducing the recording data from a disc storage medium. While the display and control block is connected to the disc drive block, the reproduced data read from the side of the disc drive block is sequentially transmitted to the display and control block and displayed thereon. Thereby, while being carried, the display and control block is disconnected from the disc drive block, and the reproduced data stored in the semiconductor bulk storage means is displayed on the display means according to the search condition inputted by the key signal inputting means, so that the necessary data can be freely searched without carrying the thick and heavy disc drive block. This feature enhances the convenience of the device.

The nature, principle and utility of the invention will become more apparent from the following detailed description when read in conjunction with the accompanying drawings in which like parts are designated by like reference numerals or characters.

DETAILED DESCRIPTION OF THE INVENTION

Figure 1:
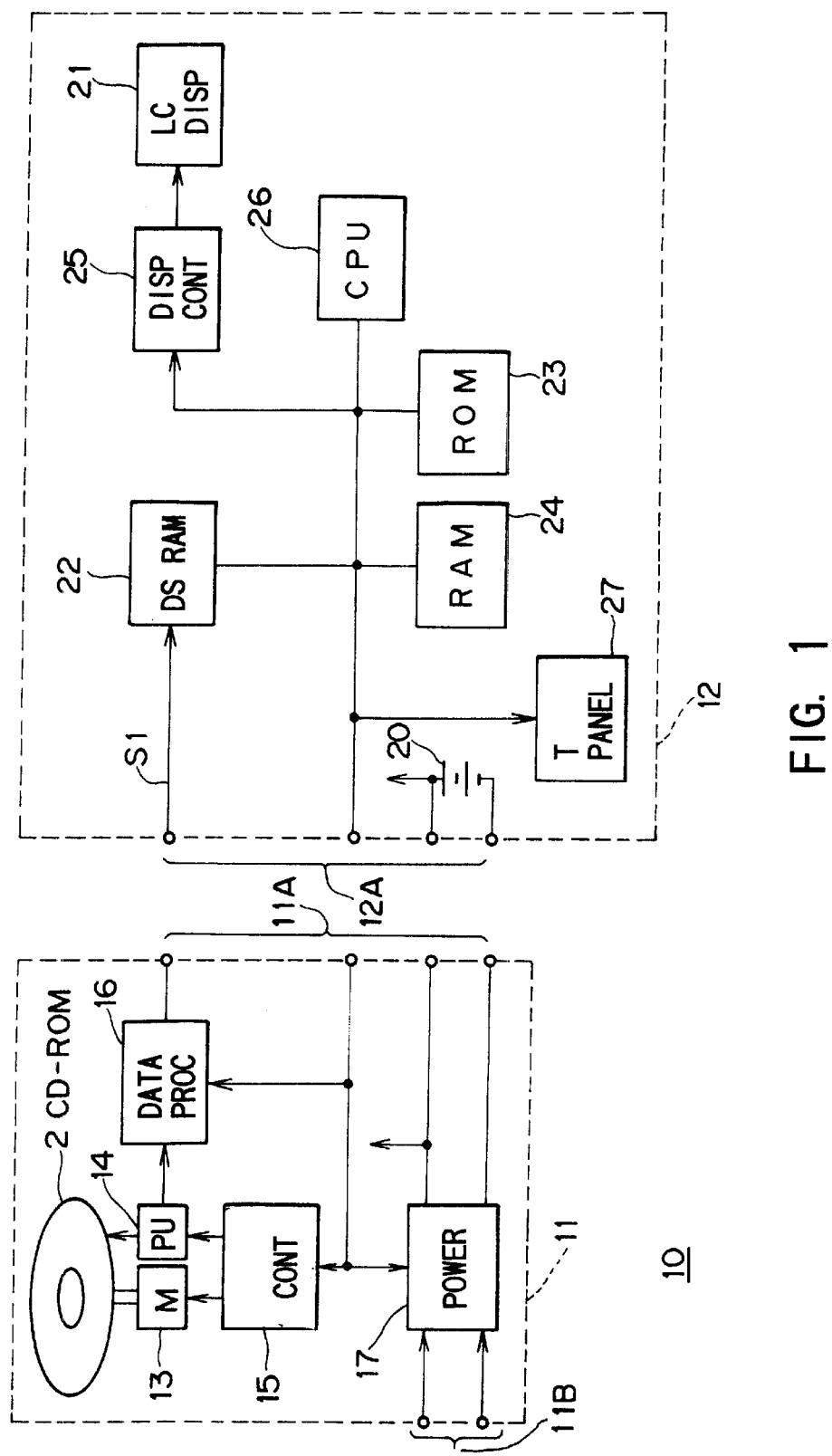
FIG. 1 is a block diagram showing an embodiment of the search and display apparatus in the present invention.

Preferred embodiments of this invention will be described with reference to the accompanying drawings:

In FIG. 1, a reference numeral 10 generally designates a disc reproducing apparatus. The disc reproducing apparatus 10 is composed of a main unit 11 having a driving system of CD-ROM 2 and a data processing circuit system, and a display panel unit 12 including the other control circuit systems.

That is, the main unit 11 comprises a motor driving circuit 13 for rotatably driving the CD-ROM 2 in either constant linear velocity (CLV) or constant angular velocity (CAV), an optical pick-up block 14 for reproducing the stored data from the CD-ROM 2, the control circuit 15 for controlling by detecting rotation error, tracking error and focussing error of the motor driving circuit 13 and the pick-up block 14, a data processing circuit 16 for data processing and transmitting the reproduced data through a connector 11A, and a power supply unit 17.

In this connection, the power supply unit 17 supplies DC voltage, which is obtained by converting AC current from the power terminal 11B, to each unit of the main unit 11, and charges the battery 20 of the display panel unit 12 via the connector 11A.

The display panel unit 12 is composed of a separate case which is easily removable from the main unit 11, which can be easily connected to and disconnected from the female connector 11A (not shown) of the main unit 11 by means of the male connector 12A provided on the lower part, so that while the main unit 11 is connected to the display panel unit 12, the data and the control signals are transmitted through these connectors 11A and 12A (FIG. 2) from the main unit 11 to the display panel unit 12.

At the back side of a liquid crystal display 21 of the display panel unit 12, a semiconductor bulk storage 22 of RAM (random access memory) for storing the data, a ROM (read only memory) 23 for storing the control program and search program, and a RAM 24 to be used for displaying the picture and for executing various computations are arranged. In addition, the display controller 25 for displaying the reproduced data on the liquid crystal display 21 and the CPU 26 are arranged.

On the front surface of the liquid crystal display 21, there is provided a touch panel unit 27 of transparent electrodes, based on the key operation to the touch panel unit 27, the CPU 26 controls each processing circuit of the main unit 11 and the display panel unit 12.

In the above construction, if it is unnecessary to carry the disc reproducing apparatus 10, the user uses and connects the connector 12A of the display panel unit 12 to the connector 11A of the main unit 11. In this state, the CPU 26 sequentially reads from the CD-ROM 2 the data which corresponds to the search condition entered by the touch panel unit 27 using the search program stored in the ROM 23, and the read out data are displayed on the liquid crystal display 21.

On the other hand, if it is necessary to carry around the disc reproducing apparatus 10, the user operates it to read the data stored in the CD-ROM 2 as much as possible, so as to store the data in the data RAM 22, and to charge the battery 20 by the power supply 17. After the completion of the storing and charging, the user disconnects the display panel unit 12 from the main unit 11 to carry along only the display panel unit 12.

Here, if the user enters the search condition using the touch panel unit 27, the CPU 26 searches the data corresponding to the search condition from the data RAM 22 using the program stored in the ROM 23, and the searched result is displayed on the liquid crystal display 21 via the display controller 25.

In this case, the data search operation of the CPU 26 is executed as a read operation of the data RAM 22, therefore it is unnecessary to access the CD-ROM 2 each time, and the access time is drastically reduced.

It is especially effective in the case where the data desired to be displayed are discontinuous and there must frequently be a search for the data corresponding to the search condition.

Further, since only the display panel unit 12 can be disconnected and carried around, it is easier to carry around compared with carrying a display panel unit 12 integratedly connected to the main unit. In addition, it is unnecessary to drive the mechanism units, such as the motor, thereby lowering the power consumption and increasing the time of use.

With the above construction, there mounts a data RAM 22 into which all of the data stored in the CD-ROM 2 can be written on the display panel unit 12. The liquid crystal display 21, the ROM 23, the RAM 24, the display controller 25 and the CPU 26 are mounted in the display panel unit 12 as separated portions apart from the driving portions necessary in for the reproduction of the CD-ROM 2, so that when carrying, only the display panel unit 12 which is compact in size and light in weight needs to be carried, therefore the convenience for use can be enhanced.

Figure 2:
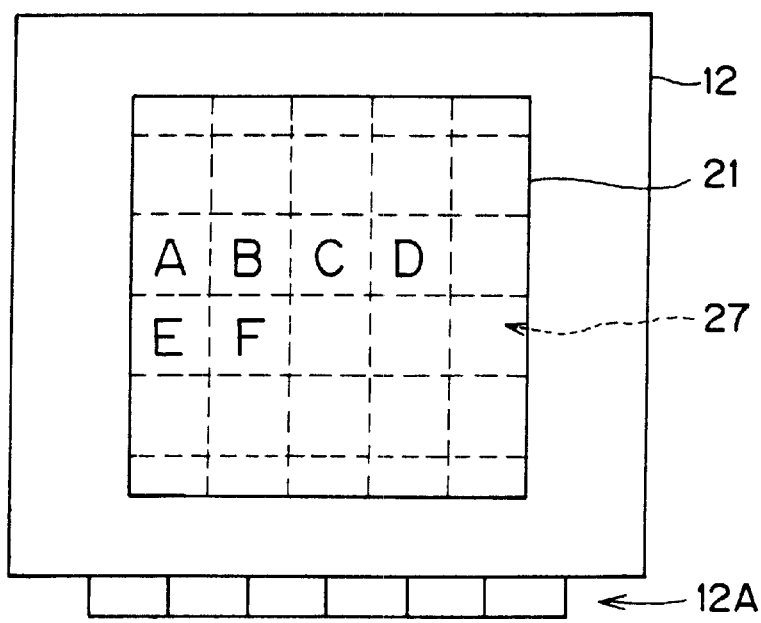
FIG. 2 is a schematic plane view showing an embodiment of the display panel unit.
Figure 3:
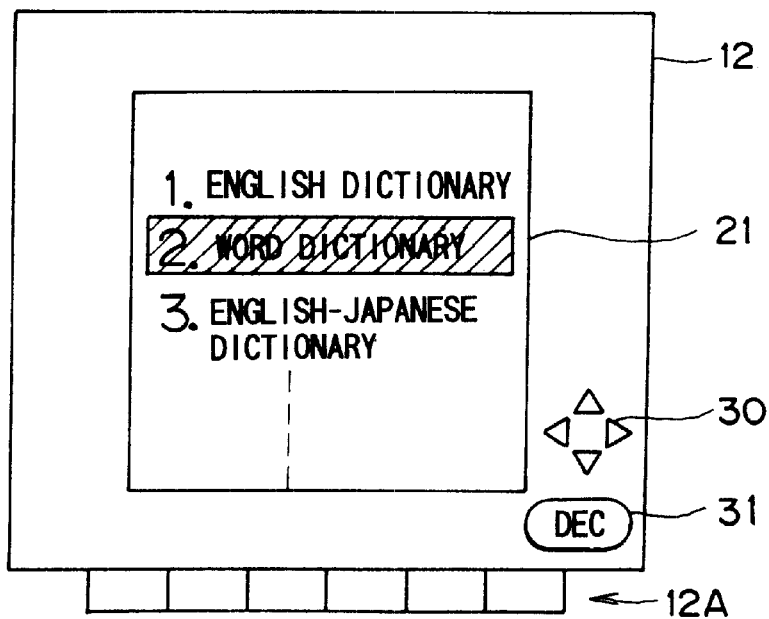
FIG. 3 is a schematic plane view showing the other embodiment of the display panel unit.

Note that, in the embodiment discussed above, the case where the display panel unit 12 is constructed as shown in FIG. 2 and the operation key of the CPU 26 is formed as a touch panel unit 27 on the liquid crystal display 21 in layers, however this invention is not limited to this. The CPU 26 may be operated by a cursor key 30 and a decision key 31 provided on the side of the liquid crystal display 21 as shown in FIG. 3 for searching and displaying a desired portion of the data stored in the RAM 24.

Further, in the embodiment discussed above, the main unit 11 can be connected to the display panel unit 12 by the connectors 11A and 12A, however this invention is not limited to this. It is widely applicable to a case where connecting them by other connecting means, such as a connecting cable, making connect and a disconnect easy.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A search and display apparatus, comprising:
   a) a first housing carrying a disc drive block including:
      a disc drive for reproducing output data from a CD-ROM disc; and
      an electric power source; and
   b) a second housing carrying a display and control block, said second housing further including a rechargeable battery capable of being charged by said electric power source, said display and control block including:
      a display unit for displaying output data;
      an input unit for inputting search data;
      a first memory for temporarily storing output data reproduced from said CD-ROM disc; and
      a controller coupled to said display unit, said input unit and said first memory, said controller configured to control the output data display on said display unit, and to control data reproduction from said first memory and said CD-ROM disc in accordance with said search data;
      wherein:
      b1) when said first housing is coupled to said second housing, said electric power source recharges said rechargeable battery at a same time that:
         i) said controller sequentially accesses output data corresponding to said search data inputted via said input unit from said CD-ROM disc for display on said display unit, and ii) said controller sequentially stores said output data accessed from said CD-ROM disc in said first memory;

b2) when said first housing is de-coupled from said second housing, said controller directly accesses said output data corresponding to said search data inputted via said input unit stored in said first memory; and b3) said second housing is detached from said first housing after transferring the read-out data from the CD-ROM disc to said first memory and after charging said rechargeable battery.

2. The apparatus of claim 1 wherein said first memory is a semiconductor random access memory having sufficient memory capacity for storing the data reproduced from said CD-ROM disc.

3. The apparatus of claim 1 wherein said battery is configured to supply an operation power to said first memory, said display unit, said controller and said input unit.

4. The apparatus of claim 3 wherein said display and control block further includes a second memory, housed in said second housing, which stores control programs for controlling the operations of said disc drive housed in said first housing.

5. The apparatus of claim 4 wherein when said disc drive block and said display and control block are electrically coupled to each other, said rechargeable battery in said second housing is charged by said power source housed in said first housing.

6. The apparatus of claim 4 wherein said control programs stored in said second memory are also used for controlling the operations of said display unit, said first memory and said input unit.

7. The apparatus of claim 6 wherein said input unit of the display and control block at least includes a cursor key and a decision key for searching and displaying a desired portion of the data stored in said first memory.

8. The apparatus of claimed 6 wherein said input unit of the display and control block is a touch panel formed on said display unit and said control command is supplied to said controller through said touch panel.

9. The method of claimed 6 wherein said step of providing said input unit of the display and control block includes the step of providing a touch panel formed on said display unit and said control command is supplied to said controller through said touch panel.

10. A search and display method comprising the steps of:

a) providing a first housing carrying a disc drive block including:
   a disc drive for reproducing output data from a CD-ROM disc; and
   an electric power source; and b) providing a second housing carrying a display and control block, said second housing provided with a rechargeable battery capable of being charged by said electric power source, said step of providing a second housing carrying a display and control block including the steps of:
   providing a display unit for displaying output data;
   providing an input unit for inputting search data;
   providing a first memory for temporarily storing output data reproduced from said CD-ROM disc; and
   coupling a controller to said display unit, said input unit and said first memory for controlling the output data display on said display unit, and for controlling data reproduction from said first memory and said CD-ROM disc in accordance with said search data;

wherein:
b1) when said first housing is coupled to said second housing, said electric power source recharges said rechargeable battery at a same time that:
   i) said controller sequentially accesses output data corresponding to said search data inputted via said input unit from said CD-ROM disc for display on said display unit, and
   ii) said controller sequentially stores said output data from said CD-ROM disc in said first memory;

b2) when said first housing is de-coupled from said second housing, said controller directly accesses said output data corresponding to said search data inputted via said input unit stored in said first memory; and b3) said second housing is detached from said first housing after transferring the read-out data from the CD-ROM disc to said first memory and after charging said rechargeable battery.

11. The method of claim 10 wherein said step of providing second housing further includes the step of said battery supplying an operation power to said first memory, said display unit, said controller and said input unit.

12. The method of claim 10 wherein said step of providing said first memory includes the step of providing a semiconductor random access memory having sufficient memory capacity for storing the data reproduced from said CD-ROM disc.

13. The method of claim 11 wherein said step of providing said second housing carrying said display and control block further includes the step of housing a second memory in said second housing for storing control programs for controlling the operations of said disc drive housed in said first housing.

14. The method of claim 13 wherein when said disc drive block and said display and control block are electrically coupled to each other, said rechargeable battery in said second housing is charged by said power source housed in said first housing.

15. The method of claim 13 wherein said control programs stored in said second memory are also used for controlling the operations of said display unit, said first memory and said input unit.

16. The method of claim 15 wherein said step of providing said input unit at least includes the steps of providing a cursor key and a decision key for searching and displaying a desired portion of the data stored in said first memory.

17. An integrated portable data display apparatus, comprising:

a) a main unit including:
   a disc drive configured to reproduce data from a data recording and/or reproducing medium; and
   an electric power source; and b) a display unit configured to adaptively couple to said main unit, said display unit including:
   a rechargeable battery capable of being charged by said electric power source;
   a single controller configured to selectively control data search and display operations from said main unit and said display unit;
   a first memory coupled to said single controller configured to store data reproduced from said data storage medium in accordance with control signals from said single controller;
   an input terminal coupled to said single controller configured for inputting one or more data search requests; and
   a display panel coupled to said single controller configured to display data in accordance with the control signals from said single controller;

wherein:
- b1) when said display unit is coupled to said main unit, said electric power source recharges said rechargeable battery at a same time that:
  - i) said single controller sequentially accesses said data storage medium of said main unit in accordance with said search requests received via said input terminal, and
  - ii) said single controller displays the corresponding search result on said display panel of said display unit;
- b2) when said display unit is de-coupled from said main unit, said single controller transfers said stored data in said data storage medium of said main unit to said first memory of said display unit prior to being de-coupled such that said single controller searches said first memory in accordance with said search requests and displays the corresponding search result obtained from said first memory on said display panel of said display unit; and
- b3) said display unit is detached from said main unit after transferring the readout data from the CD-ROM disc to said first memory and after charging said rechargeable battery.

18. The apparatus of claim 17 wherein said rechargeable battery is coupled to said controller and configured to provide power to said display unit when said display unit is de-coupled from said main unit.

19. The apparatus of claim 18 wherein when said display unit is coupled to said main unit, said power source of said main unit recharges said rechargeable battery of said display unit.

20. The apparatus of claim 17 wherein said first memory of said display unit is a random access memory.

21. The apparatus of claim 20 wherein said power source is configured to provide power to said main unit and said display unit when said display unit is coupled to said main unit.

22. The apparatus of claim 21 wherein said display panel is a liquid crystal display unit.

23. The apparatus of claim 22 wherein said rechargeable battery is coupled to said controller and configured to provide power to said display unit when said display unit is de-coupled from said main unit.

24. The apparatus of claim 23 wherein when said display unit is coupled to said main unit, said power source of said main unit recharges said rechargeable battery of said display unit.

25. The apparatus of claim 17 wherein said power source is configured to provide power to said main unit and said display unit when said display unit is coupled to said main unit.

26. The apparatus of claim 25 wherein said display panel is a liquid crystal display unit.

27. The apparatus of claim 26 wherein said rechargeable battery is coupled to said controller and configured to provide power to said display unit when said display unit is de-coupled from said main unit.

28. The apparatus of claim 27 wherein when said display unit is coupled to said main unit, said power source of said main unit recharges said rechargeable battery of said display unit.

29. The apparatus of claim 17 wherein said display panel is a liquid crystal display unit.

30. The apparatus of claim 29 wherein said rechargeable battery is coupled to said controller and configured to provide power to said display unit when said display unit is de-coupled from said main unit.

31. The apparatus of claim 30 wherein when said display unit is coupled to said main unit, said power source of said main unit recharges said rechargeable battery of said display unit.

32. A method of providing an integrated portable data display apparatus, comprising the steps of:
- a) providing a main unit including:
  - a disc drive configured to reproduce data from a data recording and/or reproducing medium; and
  - an electric power source;
- b) providing a display unit configured to adaptively couple to said main unit, said step of providing said display unit including the steps of:
  - providing a rechargeable battery capable of being charged by said electric power source;
  - configuring a single controller to selectively control data search and display operations from said main unit and said display unit;
  - coupling a first memory to said single controller for storing data reproduced from
  - said data storage medium in accordance with control signals from said single controller;
  - coupling an input terminal to said single controller for inputting one or more data search requests; and
  - coupling a display panel to said single controller to display data in accordance with the control signals from said single controller;

wherein:
- b1) when said display unit is coupled to said main unit, said electric power source recharges said rechargeable battery at a same time that:
  - i) said single controller sequentially accesses said data storage medium of said main unit in accordance with said search requests received via said input terminal, and
  - ii) said single controller displays the corresponding search result on said display panel of said display unit;
- b2) when said display unit is de-coupled from said main unit, said single controller transfers said stored data in said data storage medium of said main unit to said first memory of said display unit prior to being de-coupled such that said single controller searches said first memory in accordance with said search requests and displays the corresponding search result obtained from said first memory on said display panel of said display unit; and
- b3) said display unit is detached from said main unit after transferring the readout data from the CD-ROM disc to said first memory and after charging said rechargeable battery.

33. The method of claim 32 wherein said step of providing said display unit further includes the step of coupling said rechargeable battery to said controller and providing power to said display unit when said display unit is de-coupled from said main unit.

34. The method of claim 33 wherein when said display unit is coupled to said main unit, said power source of said main unit recharges said rechargeable battery of said display unit.

35. The method of claim 32 wherein said first memory of said display unit is a random access memory.

36. The method of claim 35 wherein said power source is configured to provide power to said main unit and said display unit when said display unit is coupled to said main unit.

37. The method of claim 36 wherein said display panel is a liquid crystal display unit.

38. The method of claim 37 wherein said step of providing said display unit further includes the step of coupling said rechargeable battery to said controller and providing power to said display unit when said display unit is de-coupled from said main unit.

39. The method of claim 38 wherein when said display unit is coupled to said main unit, said power source of said main unit recharges said rechargeable battery of said display unit.

40. The method of claim 32 wherein said power source is configured to provide power to said main unit and said display unit when said display unit is coupled to said main unit.

41. The method of claim 40 wherein said display panel is a liquid crystal display unit.

42. The method of claim 41 wherein said step of providing said display unit further includes the step of coupling said rechargeable battery to said controller and providing power to said display unit when said display unit is de-coupled from said main unit.

43. The method of claim 42 wherein when said display unit is coupled to said main unit, said power source of said main unit recharges said rechargeable battery of said display unit.

44. The method of claim 32 wherein said display panel is a liquid crystal display unit.

45. The method of claim 44 wherein said step of providing said display unit further includes the step of coupling said rechargeable battery to said controller and providing power to said display unit when said display unit is de-coupled from said main unit.

46. The method of claim 45 wherein when said display unit is coupled to said main unit, said power source of said main unit recharges said rechargeable battery of said display unit.

* * * * *